Jan. 25, 1949.    H. B. SLADE    2,460,107
APPARATUS FOR TESTING INSULATED WIRES AND CABLES
Filed Dec. 29, 1945
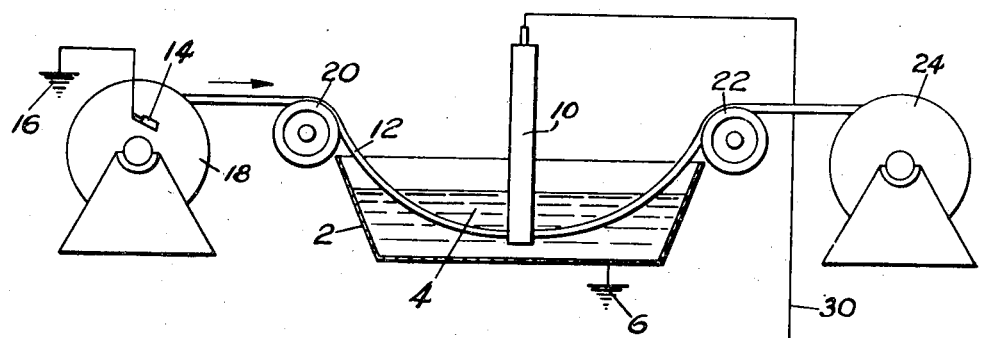
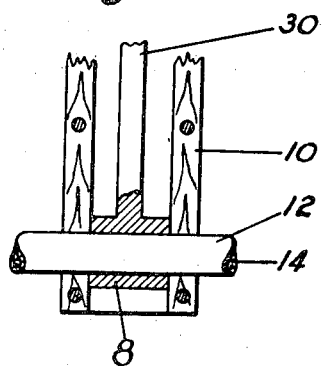
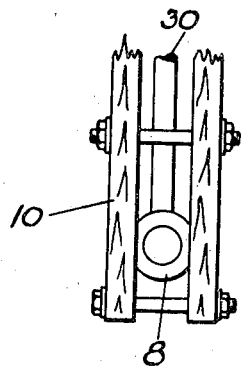
INVENTOR.
Harry B. Slade
BY
James G. Bethell.

Patented Jan. 25, 1949

2,460,107

UNITED STATES PATENT OFFICE 2,460,107

APPARATUS FOR TESTING INSULATED WIRE AND CABLE

Harry B. Slade, Passaic, N. J., assignor to The Okonite Company, Passaic, N. J., a corporation of New Jersey Application December 29, 1945, Serial No. 637,890

3 Claims. (Cl. 175—183)

This invention relates to the testing of insulated wire and cable hereinafter referred to for brevity as insulated cable, the principle involved being that of ionization detection.

When a dry spark test is applied to an insulated conductor, such as insulated cable, there is considerable ionization of the air on the outside surface of the insulation next to the high voltage electrode. While faulty insulation can be broken down by this type of test the voltage required is sometimes excessive especially on thick walls of insulation. Then again the time of voltage application is usually so short that the faulty spot may not break down but may be injured further so that it will fail in service use.

The same difficulty is experienced when testing whole reels of insulated cable submerged in water where the time of voltage applications, which is usually five to ten minutes, may not be sufficient to completely puncture a fault with the result that the puncture is completed in service use.

Usually a fault or imperfection in the insulation of a cable is in the nature of a cavity or void containing some air at atmospheric pressure or possibly at reduced pressure. When voltage is applied to the insulation, ionization occurs in this cavity and ozone attack may be sufficient to cut through and reduce the insulating wall to the point where the cable fails depending upon the period of voltage application.

Prior to my invention the methods employed for detecting this ionization have been confined to subjecting short lengths of insulated conductor to voltage with the exterior of the insulation perfectly shielded and the ionization at the ends suppressed in some manner; or to surrounding the insulation by an electrode at high voltage with the conductor grounded. In the latter case the voltage on the electrode must be low enough to prevent ionization between the electrode and the insulation.

As distinguished from these prior methods my invention provides for high voltage electrode continuous testing with suppression of exterior ionization by means of a dielectric liquid.

More specifically my invention provides a method and apparatus in which the insulated cable to be tested is continuously run through a close fitting electrode which is in contact with and submerged in a dielectric liquid such as an insulating oil, molten wax, etc. The electrode is connected to a high voltage source, and the conductor of the cable is grounded at the let-off reel or the take-up reel or both. Connected to the high voltage source is a pick-up condenser and a suitable detector, such as a radio frequency detector for example. Ionization discharge has large radio frequency components so that with the occurrence of ionization a signal is produced which becomes audible in a radio frequency detector, such as the radio receiver mentioned. It is to be understood, however, that a radio receiver is but one example of a detector capable of use with my equipment. Other electrical detectors are suitable. For example cathode ray oscilloscopes and other electrical devices will readily detect ionization discharge currents and may be used, or the discharge could be converted into an electrical impulse to operate a relay.

By having the electrode in contact with and sumerged in a liquid dielectric, not only is air excluded from around the cable which is passed through the electrode, and hence ionization prevented, but ionization from the surface of the electrode is also prevented. Consequently the electric current is confined substantially completely to the insulation of the cable being tested, so that any imperfections anywhere in this insulation of a cavity nature will be subjected to voltage, ionization will occur in the cavity and the ionization discharge will be picked up in a radio receiver or other detector employed. In addition, sharp conducting particles either on the conductor, in the insulation, or in the outer surface will cause discharge and be detected. It will be appreciated also that by having the electrode submerged in a liquid dielectric higher voltages may be used than previously have been possible.

In the accompanying drawing which illustrates one embodiment of my invention,

Fig. 1 is a side elevational view partly in section, showing the complete layout;

Fig. 2 is a detail of the electrode construction; and

Fig. 3 is a fragmentary view of the construction shown in Fig. 2, Fig. 3 being taken at right angles to Fig. 2.

Referring to the drawings in detail, 2 designates a testing tank, containing a liquid dielectric 4, such as insulating oil, molten paraffin, or other suitable liquid dielectric.

For the protection of personnel, the tank 2 is preferably grounded as shown at 6.

The testing electrode is designated 8 and as shown in Figs. 2 and 3 is clamped in and supported by a suitable open wood, fiber or other dielectric support 10 within the tank 2 so as to be submerged in and in contact with the liquid dielectric 4 at all times. As will be apparent from the drawings, the electrode 8 is tubular and its inside diameter is such as closely to fit the insulation 12 to be tested.

The insulated cable to be tested has its conductor 14 grounded as shown at 16, and is continuously passed from let-off reel 18 over an idler roller 20 and into the liquid dielectric 4 in the tank 2 where it is threaded through the tight fitting tubular electrode 8. From thence the insulated cable passes out of the tank, over another idler 22 to take-up reel 24.

26 designates a high voltage source such as a variable high voltage transformer, the high voltage side 28 of which is connected to the electrode 8 by conductor 30.

Connected to the high voltage side 28 of the transformer is pick-up condenser 32 and a suitable detector 38 such as a radio receiver. As above noted in the passage of the cable through the electrode, should any imperfections be encountered in the cable insulation they will be subjected to voltage and ionization will occur, the ionization discharge being picked up by the detector 38. Should the detector be a radio receiver then the discharge is picked up as an audible signal.

The use of the pick-up condenser 32 on the high voltage side of the transformer 28, while not absolutely necessary, is advantageous, since I have found that the radio frequency ionization components are suppressed by the capacity of the cable to ground, and do not appear in the connection from the cable conductor to ground at the let-off or the take-up reel. Also in the transformer connection to ground, there is not as much radio frequency signal from ionization due to the inductance in the transformer.

It will be apparent from all of the foregoing, that my improved apparatus is very simple in construction and very efficient in operation, and that testing is continuous instead of intermittent.

It will be appreciated also that the use of the liquid dielectric permits of the use of higher voltages than are feasible when testing dry, and prevents ionization around the smooth wire or cable by excluding air; it will be appreciated furthermore that by maintaining the electrode 8 submerged in the dielectric liquid, I prevent ionization from the surface of the electrode.

As above mentioned insulating oil, molten wax, or other suitable liquid dielectric may constitute the liquid shown at 4 on the drawings. I have obtained excellent results when employing paraffin at a temperature of around 180° F. Molten paraffin is well adapted for use in testing rubber insulation in that it will not injure the insulation nor contaminate it, inasmuch as paraffin is a common constituent of rubber insulations, and molten paraffin is used quite generally to dry cables which have been submerged in water and also to improve certain properties of the insulation by making its surface somewhat waxy.

My invention however is not to be confined to testing rubber insulated cable, but is applicable to the testing of paper insulated cable, provided the outer surface of the paper insulation is not covered by a conducting tape. In testing paper insulated cables I prefer to use insulating oil as the liquid dielectric, rather than the molten paraffin.

It is to be understood that changes in the construction and arrangement of parts hereinabove described may be made within the purview of my invention.

What I claim is:

1. Apparatus for testing the insulation of insulated cable, said apparatus comprising in combination a container of liquid dielectric, a tubular electrode submerged in said dielectric, the inside diameter of the tubular electrode being such that it will fit snugly about the surface of the insulation of an insulated cable under test passing through the electrode, means for maintaining a potential difference between the electrode and the conductor of the cable under test, and an indicating device for detecting the presence of radio frequency currents caused by ionization discharge between the electrode and cable conductor as the cable is passing through the electrode.

2. Apparatus for the continuous testing of the insulation of insulated cable, said apparatus comprising in combination a tank containing insulating oil, a tubular electrode submerged in the oil, the inner diameter of the electrode being such as to fit snugly about the surface of the cable insulation under test, a high voltage transformer having its secondary electrically connected to the electrode to maintain a potential difference between the electrode and the cable conductor, and an indicating device electrically connected to the transformer secondary for detecting the presence of radio frequency currents caused by ionization discharge between the electrode and cable conductor as the cable is passing through the electrode.

3. Apparatus for the continuous testing of the insulation of insulated cable, said apparatus comprising in combination a tank containing molten paraffin, a tubular electrode submerged in the paraffin, the inner diameter of the electrode being such as to fit snugly about the surface of the cable insulation under test, a high voltage transformer having its secondary electrically connected to the electrode to maintain a potential difference between the electrode and the cable conductor, and an indicating device electrically connected to the transformer secondary for detecting the presence of radio frequency currents caused by ionization discharge between the electrode and cable conductor as the cable is passing through the electrode.

HARRY B. SLADE.

REFERENCES CITED

The following references are of record in the file of this patent:

UNITED STATES PATENTS

| Number | Name | Date |
|---|---|---|
| 1,515,864 | Lapp | Nov. 18, 1924 |
| 1,724,565 | Dana | Aug. 13, 1929 |
| 1,880,917 | Eastlake | Oct. 4, 1932 |
| 1,919,802 | Pfeiffer | July 25, 1933 |
| 1,943,392 | Paine et al. | Jan. 16, 1934 |
| 2,194,303 | Germeck | Mar. 19, 1940 |
| 2,348,157 | Smith et al. | May 2, 1944 |